(12) United States Patent
Meier et al.

(10) Patent No.: US 10,040,906 B2
(45) Date of Patent: Aug. 7, 2018

(54) CYANATE ESTER/ARYL ETHYNYL POLYIMIDE RESINS FOR COMPOSITE MATERIALS

(71) Applicant: Airbus Defence and Space GmbH, Taufkirchen (DE)

(72) Inventors: Christoph Meier, München (DE); Patricia Parlevliet, München (DE); Manfred Doering, Woerth am Rhein (DE)

(73) Assignee: Airbus Defence and Space GmbH (DE)

( * ) Notice: Subject to any disclaimer, the term of this patent is extended or adjusted under 35 U.S.C. 154(b) by 26 days.

(21) Appl. No.: 15/200,155

(22) Filed: Jul. 1, 2016

(65) Prior Publication Data

US 2017/0002147 A1 Jan. 5, 2017

(30) Foreign Application Priority Data

Jul. 3, 2015 (DE) .................. 10 2015 008 496

(51) Int. Cl.
| | |
|---|---|
| *C08G 79/08* | (2006.01) |
| *C08G 73/16* | (2006.01) |
| *C08G 73/06* | (2006.01) |
| *C08L 63/00* | (2006.01) |
| *C08L 79/06* | (2006.01) |

(52) U.S. Cl.
CPC ......... *C08G 73/16* (2013.01); *C08G 73/0644* (2013.01); *C08G 73/0655* (2013.01); *C08L 63/00* (2013.01); *C08L 79/06* (2013.01)

(58) Field of Classification Search
None
See application file for complete search history.

(56) References Cited

U.S. PATENT DOCUMENTS

| | | | |
|---|---|---|---|
| 4,370,462 A | 1/1983 | Ikeguchi | |
| 4,774,282 A | 9/1988 | Qureshi | |
| 2014/0316027 A1* | 10/2014 | Thompson | C08J 5/24 523/222 |

FOREIGN PATENT DOCUMENTS

| | | |
|---|---|---|
| JP | S56127629 A | 10/1981 |
| JP | S62283126 A | 12/1987 |
| JP | S63170419 A | 7/1988 |
| JP | H05255592 A | 10/1993 |

(Continued)

OTHER PUBLICATIONS

T. Iijima, T. Tomohiro and M. Tomoi, Modification of Cyanate Ester Resin by Soluble Polyimides, Journal of Applied Polymer Science, 2003, 88, 1-11.

(Continued)

*Primary Examiner* — Ana L Woodward
(74) *Attorney, Agent, or Firm* — Lerner, David, Littenberg, Krumholz & Mentlik, LLP

(57) ABSTRACT

A polymerizable thermoset composition including a polymerizable organic cyanate ester resin and a polymerizable aryl ethynyl-terminated polyimide, a polymerized thermoset, a process for the production of the polymerized thermoset as well as the use of the polymerizable thermoset composition for the production of lightweight construction components, preferably carbon fiber composite materials (CFC), and a lightweight construction component, preferably carbon fiber composite material (CFC), containing the polymerized thermoset are described.

10 Claims, 4 Drawing Sheets

(56) References Cited

FOREIGN PATENT DOCUMENTS

| JP | 2000344888 A | 12/2000 |
| JP | 2003526704 A | 9/2003 |
| JP | 2006312700 A | 11/2006 |
| JP | 2009274284 A | 11/2009 |

OTHER PUBLICATIONS

M. DiBerardino, Dissertation, 1993, Lehigh University.

I. Hamerton, High-performance thermoset-thermoset polymer blends: a review of the chemistry of cyanate ester-bismaleimide blends, High Performance Polymers, 1996, 8, 83-95.

J. Fan, X. Hu and C. Y. Yue, Dielectric Properties of Self-Catalytic Interpenetrating Polymer Network Based on Modified Bismaleimide and Cyanate Ester Resins, Journal of Polymer Science: Part B: Polymer Physics, 2003, 41, 1123-1134.

A. Gu, High performance bismaleimide/cyanate ester hybrid polymer networks with excellent dielectric properties, Composites Science and Technology, 2006, 66, 1749-1755.

I. Hamerton, J.M. Bartona, A. Chaplinb, B.J. Howlina and S. J. Shawb, The development of novel functionalised aryl cyanate esters. Part 2. Mechanical properties of the polymers and composites, Polymer, 2001, 42, 2307-2319.

C. Gouri, C.P. Reghunadhan Nair, R. Ramaswamy and K. N. Ninan, Thermal decomposition characteristics of Alder-ene adduct of diallyl bisphenol A novolac with bismaleimide: effect of stoichiometry, novolac molar mass and bismaleimide structure, European Polymer Journal, 2002, 38, 503-510.

J. M. Barton, I. Hamerton and J. R. Jones, The Synthesis, Characterisation and Thermal Behavior of Functionalised Aryl Cyanate Ester Monomers, Polymer International, 1992, 29, 145-156.

G. Anuradha and M. Sarojadevi, Synthesis and Characterization of Schiff Base Functionalized Cyanate Esters/BMI Blends, High Performance Polymers, 2006, 18, 1003-1018.

X. Hu, J. Fan and C. Y. Yue, Rheological Study of Crosslinking and Gelation in Bismaleimide/Cyanate Ester Interpenetrating Polymer Network, Journal of Applied Polymer Science, 2001, 80, 2437-2445.

M. Miyauchi, Y. Ishida, T. Ogasawara and R. Yokota, Synthesis and characterization of soluble phenylethynyl-terminated imide oligomers derived frmo pyromellitic dianhydride and 2-phenyl-4,4'-diaminodiphenyl ether, Reactive and Functional Polymers, 2013, 73, 340-345.

Yanfeng Liu, Zhen Wang, Gao Li and M. Ding, High Performance Polymers, 2010, 22, 95-108.

Lohani et al, Interpentrating Polymer Networks as Innovative Drug Delivery Systems, Journal of Drug Delivery, vol. 2014, 1-11, (2014).

Marella VV, Throckmorton JA, Palmese GR, Hydrolytic Degradation of Highly Crosslinked Polyaromatic Cyanate Ester Resins, Polymer Degradation and Stability (2014), doi:10.1016/j.polymdegradstab.2014.03.029.

I. Hamerton, Chemistry and Technology of Cyanate Ester Resins 1st Edition, 1994, Blackie Academic and Professional, an imprint of Chapman & Hall, Glasgow (pp. 60-63; 72-77).

\* cited by examiner

CYANATE ESTER/ARYL ETHYNYL POLYIMIDE RESINS FOR COMPOSITE MATERIALS

FIELD OF THE INVENTION

The present invention relates to a polymerizable thermoset composition, a polymerized thermoset, a process for the production of the polymerized thermoset as well as to the use of the polymerizable thermoset composition for the production of lightweight construction components, preferably carbon fibre composite materials (CFC) and a lightweight construction component, preferably carbon fibre composite material (CFC), containing the polymerized thermoset.

BACKGROUND OF THE INVENTION

Today's commercially employed thermoset material systems usually have maximum glass transition temperatures of 180° C. and are described as epoxy resins. However, glass transition temperatures of 180° C. are too low for many applications, particularly under high thermal and mechanical loads. In contrast, other commercially available materials for high temperature applications are often toxic (for example BMI), very expensive and/or difficult to process. Cyanate esters, on the other hand, have low viscosities at low temperatures, which means that it is possible to use these thermosets in injection processes (such as RTM, VAP etc.). In addition, compared with other high temperature-resistant thermosets, they are inexpensive and commercially available. One disadvantage of cyanate esters, however, is that because of the high cross-linking density of the triazine network, they are usually very brittle. In addition, the triazine network can be sensitive to moisture. In order to be able to use cyanate esters in aviation, then, suitably appropriate modifications or blends have to be produced.

Polyimides are very expensive, which usually limits the use of these thermosets to highly specialized applications and demanding situations. What is more, polyimides have high melting temperatures and at the same time have very high viscosities, and so frequently, they can only be processed using special equipment and techniques. However, polyimides are distinguished by an extraordinarily high thermal stability with simultaneous high mechanical strength. In order to be able to process polyimides into matrix resins for fibre-reinforced composites, however, appropriate modifications have to be carried out.

Many cyanate ester (CE)/polyimide combinations are known. As an example, polyimides have recently been used primarily in the form of thermoplasts in order to modify the impact strength of brittle cyanate esters; see, for example, T. Iijima, T. Tomohiro and M. Tomoi, *Journal of Applied Polymer Science*, 2003, 88, 1-11 or M. DiBerardino, Dissertation, 1993, Lehigh University. U.S. Pat. No. 4,370,462 describes the modification of a cyanate ester system using an ethynyl-terminated polyimide and an amine. In that document, the cyanate ester is initially reacted with the ethynyl-terminated polyimide in a pre-reaction, whereupon a mixture which is soluble in N-methylpyrrolidone is formed. It is assumed therein that the nucleophilic nitrogen of the cyanate ester reacts with the π-bond of the terminal ethynyl via a Michael addition reaction. In the second step, the product which is formed is dissolved in N-methylpyrrolidone and cross-linked with the aid of a transition metal catalyst and a polyfunctional amine. The end group of the polyimide used is exclusively limited to ethynyl. Furthermore, the development of the thermosetting interpenetrating network starting from cyanate esters and aryl ethynyl-terminated polyimides which are described in the present invention is governed by a completely different mechanism to that described for the formation of the thermoset network described in U.S. Pat. No. 4,370,462.

I. Hamerton, *High Performance Polymers*, 1996, 8, 83-95; S. P. Qureshi, U.S. Pat. No. 4,774,282; J. Fan, X. Hu and C. Y. Yue, *Journal of Polymer Science: Part B: Polymer Physics*, 2003, 41, 1123-1134; A. Gu, *Composites Science and Technology*, 2006, 66, 1749-1755; I. Hamerton, J. M. Bartona, A. Chaplinb, B. J. Howlina and S. J. Shawb, *Polymer*, 2001, 42, 2307-2319 and C. Gouri, C. P. Reghunadhan Nair, R. Ramaswamy and K. N. Ninan, *European Polymer Journal*, 2002, 38, 503-510 describe the covalent bonding of an imide-containing polymer and a cyanate ester using the example of BT (bismaleimide/triazine) resins. J. M. Barton, I. Hamerton and J. R. Jones, *Polymer International*, 1992, 29, 145-156 describe that preferably, a compatibilizer is added to the thermoset blend since a covalent bond between a cyanate ester and a bismaleimide network cannot be formed directly. The constitution and the chemical/physical characterization as well as the invenstigation of the mechanical properties of the blend consisting of cyanate ester/bismaleimide/DABPA has already been investigated in detail; see U.S. Pat. No. 4,774,282; C. Gouri, C. P. Reghunadhan Nair, R. Ramaswamy and K. N. Ninan, *European Polymer Journal*, 2002, 38, 503-510; G. Anuradha and M. Sarojadevi, *High Performance Polymers*, 2006, 18, 1003-1018 and X. Hu, J. Fan and C. Y. Yue, *Journal of Applied Polymer Science*, 2001, 80, 2437-2445. Furthermore, I. Hamerton, J. M. Bartona, A. Chaplinb, B. J. Howlina and S. J. Shawb, *Polymer*, 2001, 42, 2307-2319 describe the constitution of an alkenyl-functionalized aryl cyanate ester which is capable of reacting with a commercial cyanate ester resin and simultaneously, via the allyl function, with the π-bond of the bismaleimide.

In general, cross-linkable polyimides perform very well as regards thermal resistance as well as mechanical strength; see Yanfeng Liu, Then Wang, Gao Li and M. Ding, *High Performance Polymers*, 2010, 22, 95-108 and M. Miyauchi, Y. Ishida, T. Ogasawara and R. Yokota, *Reactive and Functional Polymers*, 2013, 73, 340-345. Thus, this type of thermoset is potentially suitable for modifying the impact strength of brittle resin systems such as cyanate esters, for example, without loss of thermo-mechanical properties such as the $T_g$ as well as the thermal capacity.

BRIEF SUMMARY OF THE INVENTION

Thus, it would be desirable to provide a polymerizable thermoset composition the impact strength of which is modified and which has good thermo-mechanical properties, in particular a high glass transition temperature, a high thermal capacity as well as a low hydrolytic degradation. Furthermore, it would be desirable to provide a polymerizable thermoset composition which is easy to process and has a low curing temperature. Still further, it would be desirable to provide a polymerizable thermoset composition which is suitable for the production of light constructive components such as, for example, carbon fibre composites (CFC).

Thus, the aspect of the present invention may provide a polymerizable thermoset composition which in the cured state has good thermo-mechanical properties and in particular, compared with pure cyanate ester resins, does not exhibit any loss of thermo-mechanical properties. A further aspect of the present invention may provide a polymerizable thermoset composition in the cured state which has a high glass transition temperature, in particular a glass transition temperature which is increased compared with pure cyanate ester resins. A yet still further aspect of the present invention may provide a polymerizable thermoset composition in the cured state which has a high impact strength, in particular an impact strength which is improved compared with pure cyanate ester resins. A yet still further aspect of the present invention may provide the polymerizable thermoset composition with a high thermal capacity in the cured state, in particular a thermal capacity which is improved compared with pure cyanate esters. In a yet still further aspect of the present invention, the polymerizable thermoset composition has a lower hydrolytic degradation in the cured state compared with pure cyanate ester resins. In a yet still further aspect of the present invention, the polymerizable thermoset composition has good processability and a lower curing temperature, in particular compared with pure polyimides.

Correspondingly, in a first aspect, the present invention provides a polymerizable thermoset composition, comprising
a) a polymerizable organic cyanate ester resin, and
b) a polymerizable aryl ethynyl-terminated polyimide.

The polymerizable thermoset composition in accordance with an embodiment of the invention has good thermomechanical properties in the cured state and in particular, compared with pure cyanate ester resins, no loss of thermomechanical properties. A further advantage is that the polymerizable thermoset composition in accordance with an embodiment of the invention has a high glass transition temperature in the cured state, in particular a glass transition temperature which is increased compared with pure cyanate ester resins. A further advantage is that the polymerizable thermoset composition in accordance with an embodiment of the invention has a high impact strength in the cured state, in particular an impact strength which is improved compared with pure cyanate ester resins. A further advantage is that the polymerizable thermoset composition in accordance with an embodiment of the invention has a high thermal capacity in the cured state, in particular a thermal capacity which is improved compared with pure cyanate ester resins. A further advantage is that, compared with pure cyanate ester resins, the polymerizable thermoset composition in accordance with an embodiment of the invention has reduced hydrolytic degradation in the cured state. A further advantage is that the polymerizable thermoset composition in accordance with an embodiment of the invention has good processability and a lower curing temperature, in particular compared with pure polyimides.

As an example, the cross-linkable organic cyanate ester resin is a compound of the formula (I):

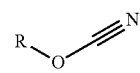

wherein R represents an alkyl, alkenyl or aryl group, optionally comprising at least one further cyanate ester group.

As an example, the cross-linkable organic cyanate ester resin is a compound of the formula (II):

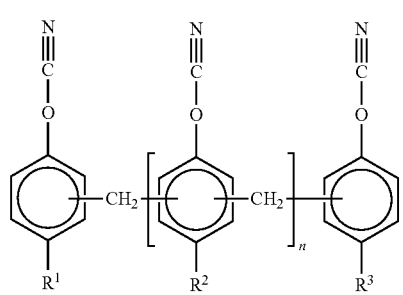

wherein $R^1$, $R^2$ and $R^3$, independently of each other, represent hydrogen or $C_1$-$C_{10}$ alkyl and n represents an integer from 0 to 20.

As an example, the cross-linkable aryl ethynyl-terminated polyimide is a compound of the formula (III):

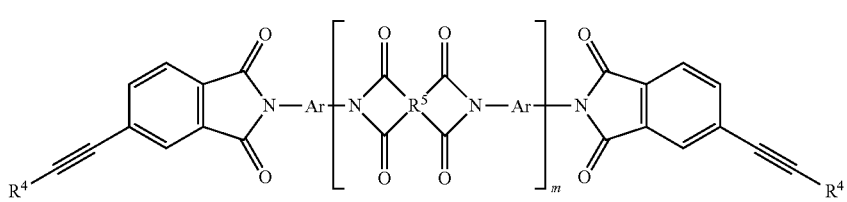

wherein Ar represents an intermediate segment which is selected from the group comprising

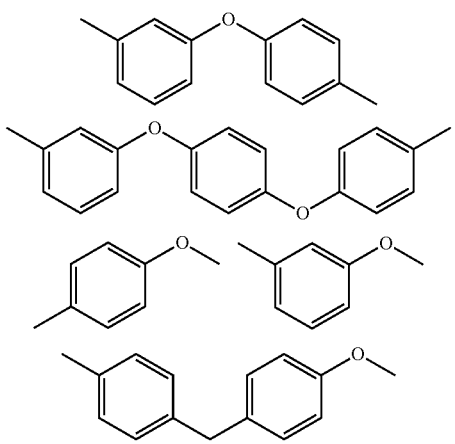

-continued

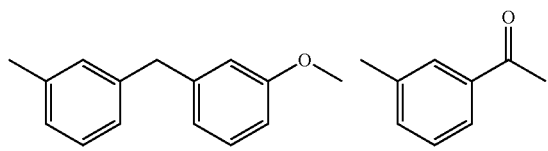

$R^4$ represents a group selected from the group comprising

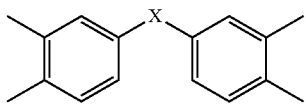

$R^5$ represents a group selected from the group comprising

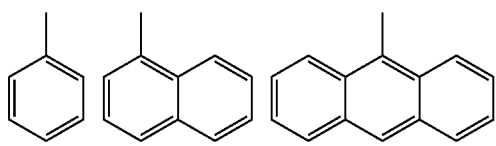

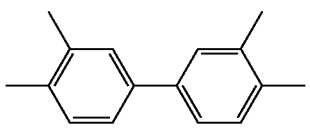

wherein X represents a group selected from the group comprising —O—, —S—, —S(O$_2$)—, —C(O)—, —C(CH$_3$)$_2$—, —C(CF$_3$)$_2$—, —CH$_2$—, 3-oxyphenoxy, 4-oxyphenoxy, 4'-oxy-4-biphenoxy and 4-[1-(4-oxyphenyl)-1-methylethyl]-phenoxy, and m represents an integer from 1 to 40.

As an example, the cross-linkable organic cyanate ester resin and the cross-linkable aryl ethynyl-terminated polyimide are respectively in the form of non-covalently bonded interpenetrating polymeric systems.

As an example, the polymerizable thermoset composition contains the cross-linkable organic cyanate ester resin and the cross-linkable aryl ethynyl-terminated polyimide in a ratio by weight (wt/wt) of 200:10 to 20:10.

As an example, the polymerizable thermoset composition comprises at least one allyl compatibilizer comprising at least two functional groups selected from the group comprising hydroxides, primary amines, secondary amines, anhydrides, cyanate esters, epoxides and mixtures thereof.

As an example, the at least one allyl compatibilizer is a compound of the formula (IV):

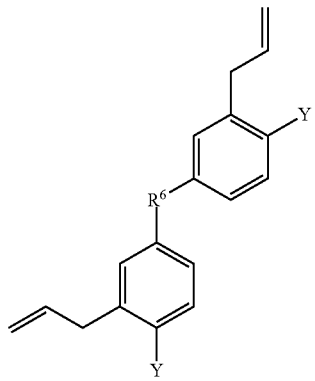

(IV)

wherein $R^6$ represents a group selected from the group comprising —O—, —S—, —S(O)$_2$—, —C(O)—, —C(CH$_3$)$_2$—, —C(CF$_3$)$_2$—, —CH$_2$—, 3-oxyphenoxy, 4-oxyphenoxy, 4'-oxy-4-biphenoxy and 4-[1-(4-oxyphenyl)-1-methylethyl]-phenoxy; and Y represents a functional group selected from the group comprising hydroxides, primary amines, secondary amines, anhydrides, cyanate esters, epoxides and mixtures thereof.

As an example, the cross-linkable organic cyanate ester resin and the cross-linkable aryl ethynyl-terminated polyimide react via the at least one allyl compatibilizer with the formation of a covalently bonded interpenetrating polymeric system.

As an example, the polymerizable thermoset composition contains the cross-linkable organic cyanate ester resin and the cross-linkable aryl ethynyl-terminated polyimide and the at least one allyl compatibilizer in a ratio by weight (wt/wt/wt) of 200:10:2 to 20:10:1.

The present invention further provides a polymerized thermoset, which represents a reaction product of the polymerizable thermoset composition, as described herein.

The present invention further provides a process for the production of the polymerized thermoset, the process comprising the following steps:
  i) providing a polymerizable thermoset composition as described herein,
  ii) polymerizing the polymerizable thermoset composition from step i) at a temperature in the range 100° C. to 330° C.

As an example, prior to step ii), the polymerizable thermoset composition from step i) is brought into contact with at least one allyl compatibilizer, as described herein.

Furthermore, the present invention concerns the use of the polymerizable thermoset composition, as described herein, for the production of lightweight construction components, preferably carbon fibre composite materials (CFC).

The present invention also concerns a lightweight construction component, preferably carbon fibre composite material (CFC), containing the polymerized thermoset as described herein.

DETAILED DESCRIPTION OF THE INVENTION

The present invention concerns a polymerizable thermoset composition, comprising
  a) a polymerizable organic cyanate ester resin, and
  b) a polymerizable aryl ethynyl-terminated polyimide.

The term "polymerizable" or "cross-linkable" means that the individual components of the composition can be polymerized under suitable conditions such as, for example, increased temperature or with the aid of catalysts.

The term "thermoset" refers to a prepolymer which can no longer be deformed after it has been cured or polymerized.

In one embodiment, the polymerizable thermoset composition consists of
a) a cross-linkable organic cyanate ester resin, and
b) a cross-linkable aryl ethynyl-terminated polyimide.

In this embodiment, the polymerizable thermoset composition is therefore essentially free from further reactive or polymerizable compounds. The polymerizable thermoset composition preferably does not comprise any solvents.

One requirement of the present invention is that the polymerizable thermoset composition comprises a polymerizable organic cyanate ester resin.

The selection of the cross-linkable organic cyanate ester resin is not critical. Preferably, however, the cross-linkable organic cyanate ester resin is a compound of the formula (I):

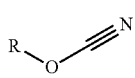
(I)

wherein R represents an alkyl, alkenyl or aryl group, optionally comprising at least one further cyanate ester group.

In one embodiment, the cross-linkable organic cyanate ester resin is a compound of the formula (I):

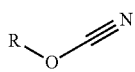
(I)

wherein R represents an alkyl, alkenyl or aryl group comprising at least one further cyanate ester group.

As an example, the cross-linkable organic cyanate ester resin is a compound of the formula (I):

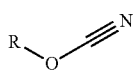
(I)

wherein R represents an aryl group, comprising at least one further cyanate ester group.

The term "at least" one further cyanate ester group means that one or more further cyanate ester group(s) is/are present. In one embodiment, one further cyanate ester group is present. Alternatively, two or more further cyanate ester groups are present.

The term "alkyl" describes a radical of a saturated aliphatic group, including linear alkyl groups and branched alkyl groups, wherein the linear alkyl groups and branched alkyl groups are preferably not substituted. This means that the linear alkyl groups and branched alkyl groups optionally comprise at least one further cyanate ester group, but are preferably free from further substituents.

The term "alkenyl" describes a radical of an unsaturated aliphatic group, including linear alkenyl groups and branched alkenyl groups, wherein the linear alkenyl groups and branched alkenyl groups are preferably unsubstituted. This means that the linear alkenyl groups and branched alkenyl groups optionally comprise at least one further cyanate ester group, but are preferably free from further substituents.

The term "aryl" describes a radical of an aromatic group, wherein the aromatic group is optionally substituted with at least one further aryl group. If the aromatic group is substituted with at least one further aryl group, each further aryl group optionally comprises at least one further cyanate ester group. In one embodiment, each further aryl group comprises at least one further cyanate ester group, but the aryl groups are preferably free from further substituents.

The term "at least" one further aryl group means that one or more further aryl group(s) is/are present. In one embodiment, one further aryl group is present. Preferably, two or more further aryl groups are present.

Preferably, the cross-linkable organic cyanate ester resin constitutes a bi- or polyfunctional organic cyanate ester resin. Preferably, the cross-linkable organic cyanate ester resin is therefore a compound of the formula (II):

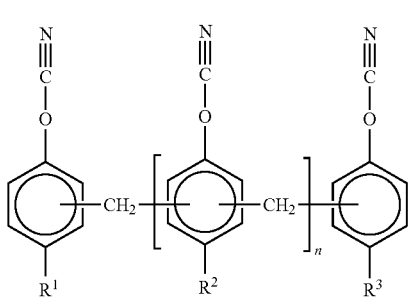
(II)

wherein $R^1$, $R^2$ and $R^3$, independently of each other, represent hydrogen or $C_1$-$C_{10}$ alkyl and n represents an integer from 0 to 20.

In one embodiment of the present invention, the cross-linkable organic cyanate ester resin is a compound of the formula (II), wherein $R^1$, $R^2$ and $R^3$, independently of each other, represent hydrogen or $C_1$-$C_{10}$ alkyl and n represents an integer from 0 to 10. Preferably, the cross-linkable organic cyanate ester resin is a compound of the formula (II), wherein $R^1$, $R^2$ and $R^3$, independently of each other, represent hydrogen or $C_1$-$C_{10}$ alkyl and n represents an integer from 1 to 5.

The methylene group in formula (II) may be in the position ortho- or para- to the cyanate group. Preferably, the methylene group in formula (II) is in the position ortho to the cyanate group.

As an example, the cross-linkable organic cyanate ester resin is a compound of the formula (II), wherein $R^1$, $R^2$ and $R^3$ are hydrogen or $C_1$-$C_{10}$ alkyl and n represents an integer from 0 to 20. Alternatively, the cross-linkable organic cyanate ester resin is a compound of the formula (II), wherein $R^1$, $R^2$ and $R^3$ are hydrogen or $C_1$-$C_{10}$ alkyl and n represents an integer from 0 to 10. Preferably, the cross-linkable organic cyanate ester resin is a compound of the formula (II), wherein $R^1$, $R^2$ and $R^3$ are hydrogen or $C_1$-$C_{10}$ alkyl and n represents an integer from 1 to 5. As an example, the cross-linkable organic cyanate ester resin is a compound of the formula (II), wherein $R^1$, $R^2$ and $R^3$ are hydrogen or $C_1$-$C_{10}$ alkyl and n represents an integer from 1 to 5, and the methylene groups are in the position ortho to the cyanate group.

In one embodiment of the present invention, the cross-linkable organic cyanate ester resin is a compound of the formula (II):

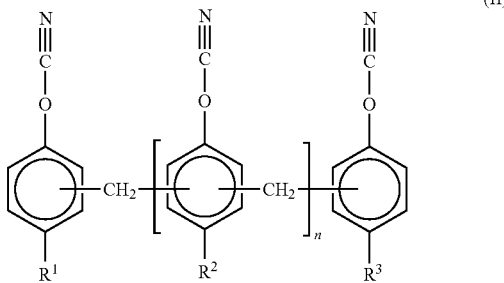
(II)

wherein $R^1$, $R^2$ and $R^3$ are hydrogen and n represents an integer from 0 to 20.

As an example, the cross-linkable organic cyanate ester resin is a compound of the formula (II), wherein $R^1$, $R^2$ and $R^3$ are hydrogen and n represents an integer from 0 to 10. Preferably, the cross-linkable organic cyanate ester resin is a compound of the formula (II), wherein $R^1$, $R^2$ and $R^3$ are hydrogen and n represents an integer from 1 to 5.

In one embodiment of the present invention, the cross-linkable organic cyanate ester resin is a compound of the formula (II), wherein $R^1$, $R^2$ and $R^3$ are hydrogen and n=1, 2 or 3. As an example, the cross-linkable organic cyanate ester resin is a compound of the formula (II), wherein $R^1$, $R^2$ and $R^3$ are hydrogen and n=1, 2 or 3, and each methylene group is in the position ortho to the cyanate group.

The cited cross-linkable organic cyanate ester resins of the formula (I) or (II) may be used as monomers or as prepolymers, alone or as blends with each other.

The polymerizable thermoset composition comprises the cross-linkable organic cyanate ester resin, preferably in a quantity, for example, of 51% to 99% by weight or 60% to 99% by weight with respect to the total weight of the composition. Alternatively, the polymerizable thermoset composition comprises the cross-linkable organic cyanate ester resin, preferably in a quantity, for example, of 70% to 98% by weight or 75% to 97% by weight with respect to the total weight of the composition. As an example, the polymerizable thermoset composition comprises the cross-linkable organic cyanate ester resin, preferably in a quantity, for example, of 82% to 90% by weight with respect to the total weight of the composition.

A further requirement of the present invention is that the polymerizable thermoset composition should comprise a polymerizable aryl ethynyl-terminated polyimide.

In principle, any cross-linkable aryl ethynyl-terminated polyimide may be used. Preferably, however, cross-linkable aryl ethynyl-terminated polyimides of the formula (III) are used. These compounds are particularly advantageous as regards obtaining a thermoset with high impact strength and at the same time with a high thermal capacity.

The aryl ethynyl-terminated polyimide is therefore preferably a compound of the formula (III):

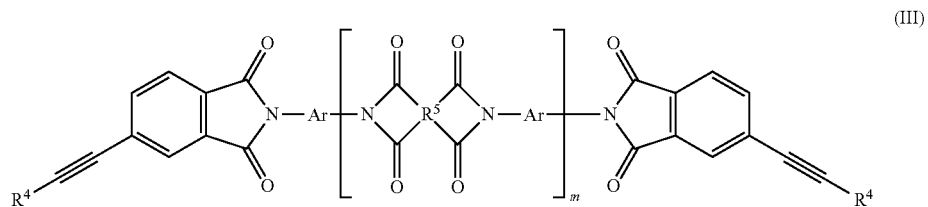
(III)

wherein Ar represents an intermediate segment which is selected from the group comprising

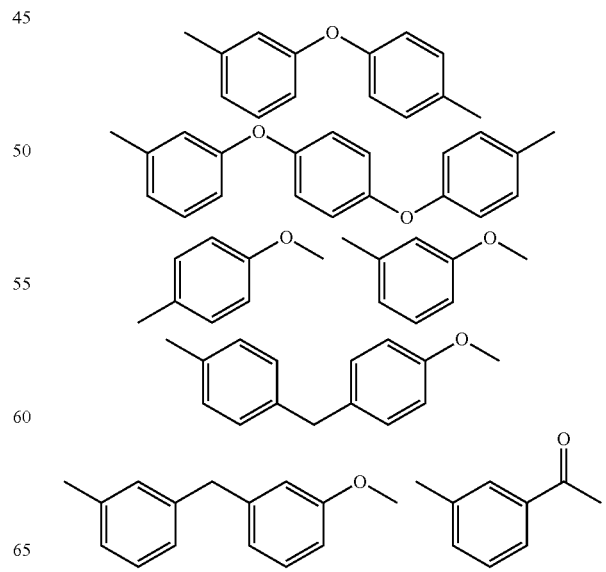

$R^4$ represents a group selected from the group comprising

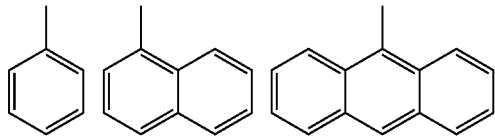

$R^5$ represents a group selected from the group comprising

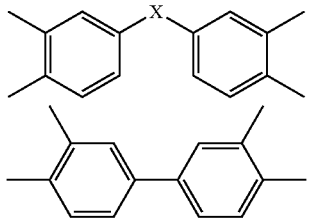

wherein X represents a group selected from the group comprising —O—, —S—, —S(O$_2$)—, —C(O)—, —C(CH$_3$)$_2$—, —C(CF$_3$)$_2$—, —CH$_2$—, 3-oxyphenoxy, 4-oxyphenoxy, 4'-oxy-4-biphenoxy and 4-[1-(4-oxyphenyl)-1-methylethyl]-phenoxy, and m represents an integer from 1 to 40.

Preferably, the aryl ethynyl-terminated polyimide is a compound of the formula (III), wherein Ar represents an intermediate segment selected from the group comprising

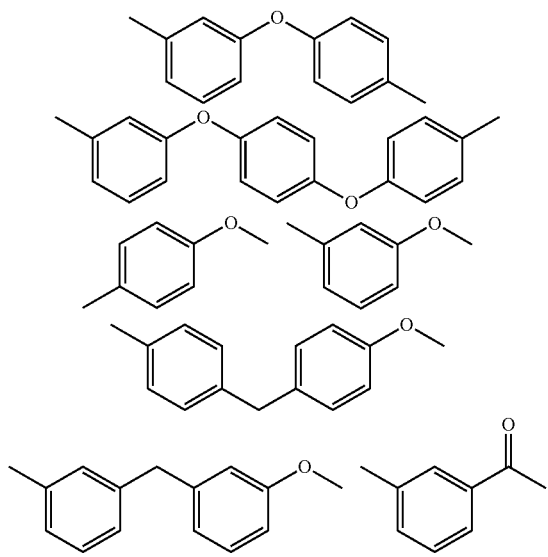

Preferably, the aryl ethynyl-terminated polyimide is a compound of the formula (III), wherein Ar represents an intermediate segment selected from the group comprising

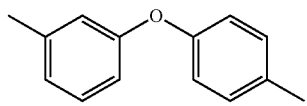

-continued

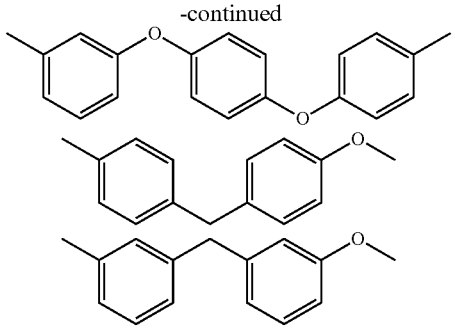

As an example, the aryl ethynyl-terminated polyimide is a compound of the formula (III), wherein Ar represents an intermediate segment selected from the group comprising

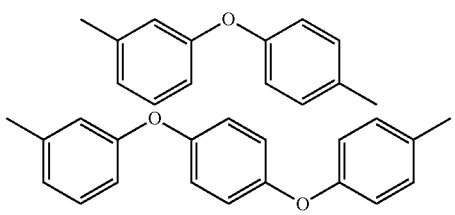

In addition or alternatively, the aryl ethynyl-terminated polyimide is a compound of the formula (III), wherein $R^4$ represents a group selected from the group comprising

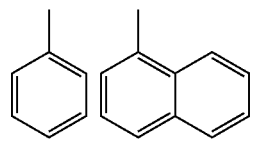

As an example, the aryl ethynyl-terminated polyimide is a compound of the formula (III), wherein $R^4$ represents

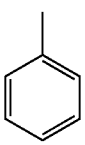

In addition or alternatively, the aryl ethynyl-terminated polyimide is a compound of the formula (III), wherein $R^5$ represents

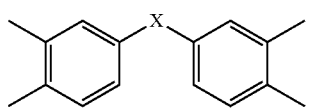

wherein X represents a group selected from the group comprising —O—, —S—, —S(O$_2$)—, —C(O)—, —C(CH$_3$)$_2$—, —C(CF$_3$)$_2$—, —CH$_2$—, 3-oxyphenoxy, 4-oxyphenoxy, 4'-oxy-4-biphenoxy and 4-[1-(4-oxyphenyl)-1-methylethyl]-phenoxy.

In addition or alternatively, the aryl ethynyl-terminated polyimide is a compound of the formula (III), wherein $R^5$ represents

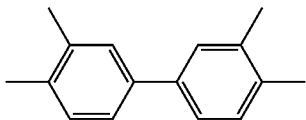

In addition or alternatively, the aryl ethynyl-terminated polyimide is a compound of the formula (III), wherein m represents an integer from 1 to 40 or 1 to 20. Preferably, the aryl ethynyl-terminated polyimide is a compound of the formula (III), wherein m represents an integer from 1 to 10 or 1 to 5.

In one embodiment, the aryl ethynyl-terminated polyimide is a compound of the formula (III), wherein Ar represents an intermediate segment selected from the group comprising

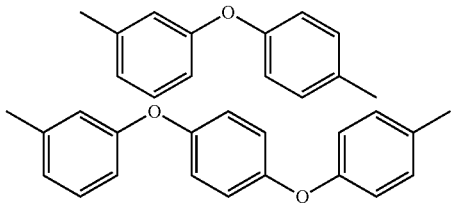

$R^4$ represents

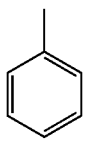

$R^5$ represents

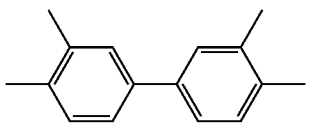

and m represents an integer from 1 to 10 or 1 to 5.

The cited aryl ethynyl-terminated polyimides of the formula (III) may be used as monomers or as prepolymers, alone or as blends with each other.

The polymerizable thermoset composition preferably comprises the aryl ethynyl-terminated polyimide in a quantity, for example, of 1% to 49% by weight or 1% to 40% by weight with respect to the total weight of the composition. Alternatively, the polymerizable thermoset composition preferably comprises the aryl ethynyl-terminated polyimide in a quantity, for example, of 2% to 30% by weight or 3% to 25% by weight with respect to the total weight of the composition. As an example, the polymerizable thermoset composition preferably comprises the aryl ethynyl-terminated polyimide in a quantity of 10% to 18% by weight with respect to the total weight of the composition.

In one embodiment, the polymerizable thermoset composition comprises, and preferably consists of:

a) a polymerizable organic cyanate ester resin in a quantity of 51% to 99% by weight, preferably 60% to 99% by weight, more preferably 70% to 98% by weight and most preferably 75% to 97% by weight with respect to the total weight of the composition, and b) a polymerizable aryl ethynyl-terminated polyimide in a quantity of 1% to 49% by weight, preferably 1% to 40% by weight, more preferably 2% to 30% by weight and most preferably 3% to 25% by weight with respect to the total weight of the composition, wherein the sum of the percentage by weight of the cross-linkable organic cyanate ester resin and of the cross-linkable aryl ethynyl-terminated polyimide is 100.

As an example, the polymerizable thermoset composition comprises, and preferably consists of:

a) a polymerizable organic cyanate ester resin in a quantity of 82% to 90% by weight with respect to the total weight of the composition, and b) a polymerizable aryl ethynyl-terminated polyimide in a quantity of 10% to 18% by weight with respect to the total weight of the composition, wherein the sum of the percentage by weight of the cross-linkable organic cyanate ester resin and of the cross-linkable aryl ethynyl-terminated polyimide is 100.

The polymerizable thermoset composition is preferably what is known as a non-covalent full IPN. The polymerizable thermoset composition therefore comprises the cross-linkable organic cyanate ester resin and the cross-linkable aryl ethynyl-terminated polyimide respectively in the form of non-covalently bonded interpenetrating polymeric systems. As an example, the polymerizable thermoset composition consists of the cross-linkable organic cyanate ester resin and the cross-linkable aryl ethynyl-terminated polyimide each in the form of non-covalently bonded interpenetrating polymeric systems.

In order to obtain a polymerized thermoset with good thermo-mechanical properties, in particular a high glass transition temperature, as well as a high impact strength, a high thermal capacity with low hydrolytic degradation, the polymerizable thermoset composition advantageously comprises the cross-linkable organic cyanate ester resin and the cross-linkable aryl ethynyl-terminated polyimide in a specific ratio by weight.

Preferably, the polymerizable thermoset composition therefore contains the cross-linkable organic cyanate ester resin and the cross-linkable aryl ethynyl-terminated polyimide in a ratio by weight (wt/wt) of 200:10 to 20:10. As an example, the polymerizable thermoset composition contains the cross-linkable organic cyanate ester resin and the cross-linkable aryl ethynyl-terminated polyimide in a ratio by weight (wt/wt) of 100:10 to 20:10 or of 90:10 to 40:10.

In one embodiment, the polymerizable thermoset composition in accordance with the invention may comprise at least one allyl compatibilizer. The addition of an allyl compatibilizer is advantageous to the production of a covalently bonded interpenetrating polymeric system. In addition, adding an allyl compatibilizer results in a resin system which now has only one glass transition temperature $T_g$ and one $T_{onset}$. Moreover, the polymerized thermoset obtained has a homogeneous phase morphology. Furthermore, the polymerized thermoset obtained by adding an allyl compatibilizer is easy to produce.

The cross-linkable organic cyanate ester resin and the cross-linkable aryl ethynyl-terminated polyimide therefore react via the at least one allyl compatibilizer with the formation of a covalently bonded interpenetrating polymeric system.

The term "at least" one allyl compatibilizer means that the polymerisable thermoset composition may include one or more allyl compatibilizers. In one embodiment, the polymerizable thermoset composition comprises an allyl compatibilizer. Alternatively, the polymerizable thermoset composition comprises two or more allyl compatibilizers. Preferably, the polymerizable thermoset composition comprises one allyl compatibilizer.

In principle, any allyl compatibilizer may be used which results in the reaction of the cross-linkable organic cyanate ester resin and the cross-linkable aryl ethynyl-terminated polyimide with the formation of a covalently bonded interpenetrating polymeric system.

Preferably, however, the at least one allyl compatibilizer is an allyl compatibilizer comprising at least two functional groups selected from the group comprising hydroxides, primary amines, secondary amines, anhydrides, cyanate esters, epoxides and mixtures thereof.

In one embodiment, the at least one allyl compatibilizer is an allyl compatibilizer comprising at least two functional groups selected from the group comprising hydroxides, primary amines, secondary amines and mixtures thereof. Alternatively, the at least one allyl compatibilizer is an allyl compatibilizer comprising at least two functional groups selected from the group comprising hydroxides or primary amines. As an example, the at least one allyl compatibilizer is an allyl compatibilizer comprising at least two functional groups selected from the group comprising hydroxides.

The term "at least" two functional groups means that the allyl compatibilizer has two or more functional groups. In one embodiment, the allyl compatibilizer has two functional groups. Alternatively, the allyl compatibilizer has more than two functional groups.

Preferably, the allyl compatibilizer has two functional groups.

In one embodiment, the at least two functional groups of the at least one allyl compatibilizer are different and each, independently of each other, is selected from the group comprising hydroxides, primary amines, secondary amines, anhydrides, cyanate esters and epoxides. Preferably, the at least two functional groups of the at least one allyl compatibilizer are identical and selected from the group comprising hydroxides, primary amines, secondary amines, anhydrides, cyanate esters and epoxides.

As an example, the at least one allyl compatibilizer is a compound of the formula (IV), wherein $R^6$ represents a group selected from the group comprising —O—, —S—, —S(O)$_2$—, —C(O)—, —C(CH$_3$)$_2$—, —C(CF$_3$)$_2$—, —CH$_2$—, 3-oxyphenoxy, 4-oxyphenoxy, 4'-oxy-4-biphenoxy and 4-[1-(4-oxyphenyl)-1-methylethyl]-phenoxy; and Y represents a functional group selected from the group comprising hydroxides, primary amines, secondary amines, anhydrides, cyanate esters, epoxides and mixtures thereof.

In one embodiment, the at least one allyl compatibilizer is a compound of the formula (IV), wherein $R^6$ represents a group selected from the group comprising —C(CH$_3$)$_2$—, —C(CF$_3$)$_2$—, —CH$_2$—, and Y represents a functional group selected from the group comprising hydroxides, primary amines, secondary amines, anhydrides, cyanate esters, epoxides and mixtures thereof.

Preferably, the at least one allyl compatibilizer is a compound of the formula (IV), wherein $R^6$ represents a group selected from the group comprising —C(CH$_3$)$_2$—, —C(CF$_3$)$_2$—, —CH$_2$—, and Y represents a functional group selected from the group comprising hydroxides, primary amines, secondary amines and mixtures thereof. As an example, the at least one allyl compatibilizer is a compound of the formula (IV), wherein $R^6$ represents a group selected from the group comprising —C(CH$_3$)$_2$—, —C(CF$_3$)$_2$—, —CH$_2$—, and Y represents a functional group selected from the group comprising hydroxides or primary amines. Alternatively, the at least one allyl compatibilizer is a compound of the formula (IV), wherein $R^6$ represents a group selected from the group comprising —C(CH$_3$)$_2$—, —C(CF$_3$)$_2$—, —CH$_2$—, and Y represents a functional group selected from the group comprising hydroxides.

Preferably, the at least one allyl compatibilizer is a compound of the formula (IV), wherein $R^6$ represents —C(CH$_3$)$_2$— or —C(CF$_3$)$_2$—, and Y represents a functional group selected from the group comprising hydroxides. In a particularly preferred embodiment, the at least one allyl compatibilizer is a compound of the formula (IV), wherein $R^6$ represents —C(CH$_3$)$_2$— and Y represents a hydroxide.

If the polymerizable thermoset composition in accordance with the invention comprises at least one allyl compatibilizer, the polymerizable thermoset composition therefore preferably comprises
  a) a polymerizable organic cyanate ester resin,
  b) a polymerizable aryl ethynyl-terminated polyimide, and
  c) at least one allyl compatibilizer comprising at least two functional groups selected from the group comprising hydroxides, primary amines, secondary amines, anhydrides, cyanate esters, epoxides and mixtures thereof.

In one embodiment, the polymerizable thermoset composition consists of
  a) a cross-linkable organic cyanate ester resin,
  b) a cross-linkable aryl ethynyl-terminated polyimide, and
  c) at least one allyl compatibilizer comprising at least two functional groups selected from the group comprising hydroxides, primary amines, secondary amines, anhydrides, cyanate esters, epoxides and mixtures thereof.

The polymerizable thermoset composition preferably does not comprise any solvents.

The polymerizable thermoset composition preferably comprises the at least one allyl compatibilizer in a quantity, for example, of 1% to 10% by weight or 1% to 9% by weight with respect to the total weight of the composition. Alternatively, the polymerizable thermoset composition comprises the at least one allyl compatibilizer in a quantity, for example, of 1% to 7% by weight with respect to the total weight of the composition.

If the polymerizable thermoset composition comprises at least one allyl compatibilizer, the polymerizable thermoset composition preferably comprises the cross-linkable organic cyanate ester resin in a quantity, for example, of 60% to 96% by weight or 63% to 95% by weight with respect to the total weight of the composition. Alternatively, the polymerizable thermoset composition preferably comprises the cross-linkable organic cyanate ester resin in a quantity, for example, of 68% to 94% by weight with respect to the total weight of the composition.

If the polymerizable thermoset composition comprises at least one allyl compatibilizer, the polymerizable thermoset composition preferably comprises the aryl ethynyl-terminated polyimide in a quantity, for example, of 3% to 30% by weight or 4% to 28% by weight with respect to the total weight of the composition. Alternatively, the polymerizable thermoset composition preferably comprises the aryl ethynyl-terminated polyimide in a quantity, for example, of 5% to 25% by weight with respect to the total weight of the composition.

In one embodiment, the polymerizable thermoset composition comprises, and preferably consists of:
- a) a polymerizable organic cyanate ester resin in a quantity of 60% to 96% by weight, preferably 63% to 95% by weight, and most preferably 68% to 94% by weight with respect to the total weight of the composition,
- b) a polymerizable aryl ethynyl-terminated polyimide in a quantity of 3% to 30% by weight, preferably 4% to 28% by weight, and most preferably 5% to 25% by weight with respect to the total weight of the composition, and
- c) at least one allyl compatibilizer comprising at least two functional groups selected from the group comprising hydroxides, primary amines, secondary amines, anhydrides, cyanate esters, epoxides and mixtures thereof, in a quantity of 1% to 10% by weight, preferably 1% to 9% by weight, and most preferably 1% to 7% by weight with respect to the total weight of the composition,
- wherein the sum of the percentage by weight of the cross-linkable organic cyanate ester resin, the cross-linkable aryl ethynyl-terminated polyimide and the at least one allyl compatibilizer is 100.

In one embodiment of the present invention, the polymerizable thermoset composition contains the cross-linkable organic cyanate ester resin and the cross-linkable aryl ethynyl-terminated polyimide and the at least one allyl compatibilizer in a specific ratio by weight. As an example, the polymerizable thermoset composition contains the cross-linkable organic cyanate ester resin and the cross-linkable aryl ethynyl-terminated polyimide and the at least one allyl compatibilizer in a ratio by weight (wt/wt/wt) of 150:6:1 to 5:2:1. Preferably, the polymerizable thermoset composition contains the cross-linkable organic cyanate ester resin and the cross-linkable aryl ethynyl-terminated polyimide and the at least one allyl compatibilizer in a ratio by weight (wt/wt/wt) of 100:5:1 to 10:3:1.

Further aids and additives may be added to the polymerizable thermoset composition. As an example, the polymerizable thermoset composition may be supplemented with slip additives such as fatty acid esters, their metallic soaps, fatty acid amides and silicone compounds, antiblock agents, inhibitors, stabilizers against hydrolysis, light, heat and discoloration, flame retardants, dyes, pigments, inorganic or organic fillers to influence the mechanical and/or dielectrical properties, and reinforcing agents. Examples of reinforcing agents which may be added are fibrous reinforcing agents such as inorganic fibres which are produced in accordance with the prior art. As an example, the polymerizable thermoset composition may comprise carbon fibres, glass fibres, aramid fibres, basalt fibres, ceramic fibres, boron fibres, steel fibres, natural fibres and/or nylon fibres. Preferably, the polymerizable thermoset composition comprises carbon fibres.

Because of the advantages offered by the polymerizable thermoset composition, the present invention also concerns a polymerized thermoset which constitutes a reaction product of the polymerizable thermoset composition as described herein.

Thus, in one embodiment, the polymerized thermoset is a reaction product of the polymerizable thermoset composition comprising, and preferably consisting of,
- a) a polymerizable organic cyanate ester resin, and
- b) a polymerizable aryl ethynyl-terminated polyimide.

In an alternative embodiment, the polymerized thermoset is a reaction product of the polymerizable thermoset composition comprising, and preferably consisting of,
- a) a polymerizable organic cyanate ester resin,
- b) a polymerizable aryl ethynyl-terminated polyimide, and
- c) at least one allyl compatibilizer comprising at least two functional groups selected from the group comprising hydroxides, primary amines, secondary amines, anhydrides, cyanate esters, epoxides and mixtures thereof.

The polymerized thermosets offer the advantage of having good thermo-mechanical properties, in particular a high glass transition temperature, and a thermal capacity with a high impact strength and low hydrolytic degradation.

Typically, the polymerized thermoset in accordance with the invention has a glass transition temperature $T_g$ of 280° C. to 350° C. Preferably, the polymerized thermoset in accordance with the invention has a glass transition temperature $T_g$ of 290° C. to 340° C. or of 300° C. to 330° C.

In addition or alternatively, the polymerized thermoset in accordance with the invention has a glass transition temperature $T_{onset}$ of 265° C. to 320° C. Preferably, the polymerized thermoset in accordance with the invention has a glass transition temperature $T_{onset}$ of 270° C. to 310° C. or of 275° C. to 300° C.

As an example, the polymerized thermoset in accordance with the invention has a glass transition temperature $T_g$ of 280° C. to 350° C., preferably 290° C. to 340° C. and more preferably 300° C. to 330° C., or a glass transition temperature $T_{onset}$ of 265° C. to 320° C., preferably 270° C. to 310° C. and more preferably of 275° C. to 300° C. Preferably, the polymerized thermoset in accordance with the invention has a glass transition temperature $T_g$ of 280° C. to 350° C., preferably 290° C. to 340° C. and more preferably 300° C. to 330° C., and a glass transition temperature $T_{onset}$ of 265° C. to 320° C., preferably 270° C. to 310° C. and more preferably 275° C. to 300° C.

In addition or alternatively, the polymerized thermoset in accordance with the invention has a curing temperature in the range 100° C. to 330° C. Preferably, the polymerized thermoset in accordance with the invention has a curing temperature in the range 125° C. to 325° C.

In one embodiment of the present invention, the polymerized thermoset in accordance with the invention has an impact strength in the range 0.2 to 1.2 MPa√m, and preferably in the range 0.5 to 0.8 MPa√m.

In addition or alternatively, the polymerized thermoset in accordance with the invention has a water absorption capacity in the range 0.1 to 2.5% by weight and preferably in the range 0.5 to 1.5% by weight, based on the total weight of the polymerized thermoset.

The polymerized thermoset in accordance with an embodiment of the invention is preferably obtained by a process as described below.

In a further aspect, the present invention therefore concerns a process for the production of a polymerized thermoset, as described herein. The process comprises the following steps:
- i) providing a polymerizable thermoset composition as described herein,
- ii) polymerizing the polymerizable thermoset composition from step i) at a temperature in the range 100° C. to 330° C.

As an example, the process for the production of a polymerized thermoset as described herein consists of the following steps:

i) providing a polymerizable thermoset composition as described herein,
ii) polymerizing the polymerizable thermoset composition from step i) at a temperature in the range 100° C. to 330° C.

Preferably, the polymerizable thermoset composition prepared in step i) is free from allyl compatibilizers. Alternatively, the polymerizable thermoset composition provided in step i) is free from compatibilizers.

In one embodiment, prior to step ii), the polymerizable thermoset composition from step i) is brought into contact with at least one allyl compatibilizer.

In one embodiment, the process for the production of a polymerized thermoset as described herein comprises the following steps:
i) providing a polymerizable thermoset composition as described herein,
ii) polymerizing the polymerizable thermoset composition from step i) at a temperature in the range 100° C. to 330° C., and
iii) prior to step ii), bringing the polymerizable thermoset composition from step i) into contact with at least one allyl compatibilizer.

As an example, the process for the production of a polymerized thermoset as described herein consists of the following steps:
i) providing a polymerizable thermoset composition as described herein,
ii) polymerizing the polymerizable thermoset composition from step i) at a temperature in the range 100° C. to 330° C., and
iii) prior to step ii), bringing the polymerizable thermoset composition from step i) into contact with at least one allyl compatibilizer.

Concerning the polymerizable thermoset composition and the at least one allyl compatibilizer, reference should be made to the above discussions regarding the polymerizable thermoset composition, the at least one allyl compatibilizer and their embodiments.

In one embodiment, the polymerizable thermoset composition in step i) comprises further aids and additives such as, for example, reinforcing agents, for example carbon fibres, glass fibres, aramid fibres, basalt fibres, ceramic fibres, boron fibres, steel fibres, natural fibres and/or nylon fibres, preferably carbon fibres.

The process in accordance with the invention for the production of the polymerized thermoset has the advantage that it does not require any pre-reactions of the individual components, i.e. the cross-linkable organic cyanate ester resin, the cross-linkable aryl ethynyl-terminated polyimide and the optional at least one allyl compatibilizer, or indeed any complicated reaction steps, so that the processability of the polymerizable thermoset composition is good.

The polymerizable thermoset composition in accordance with the invention can in general be provided by mixing the cross-linkable organic cyanate ester resin and the cross-linkable aryl ethynyl-terminated polyimide and the optional at least one allyl compatibilizer. Processes for mixing a plurality of components are known in the prior art. As an example, mixing of the cross-linkable organic cyanate ester resin, and the cross-linkable aryl ethynyl-terminated polyimide and the optional at least one allyl compatibilizer may be accomplished by stirring.

In one embodiment, mixing of the cross-linkable organic cyanate ester resin and of the cross-linkable aryl ethynyl-terminated polyimide is carried out at increased temperatures. Mixing of the cross-linkable organic cyanate ester resin and the cross-linkable aryl ethynyl-terminated polyimide at increased temperatures has the advantage that the cross-linkable aryl ethynyl-terminated polyimide can be dissolved in the cross-linkable organic cyanate ester resin, meaning that processability is facilitated, in particular in injection processes, and the polymerized thermoset can be produced without the use of solvents.

In an alternative embodiment, mixing of the cross-linkable organic cyanate ester resin, the cross-linkable aryl ethynyl-terminated polyimide and the at least one allyl compatibilizer is carried out at increased temperatures. Mixing of the cross-linkable organic cyanate ester resin, the cross-linkable aryl ethynyl-terminated polyimide and the at least one allyl compatibilizer at increased temperatures results in the formation of a heterogeneous system which only produces a homogeneous phase morphology following polymerization. Preferably, mixing of the cross-linkable organic cyanate ester resin, the cross-linkable aryl ethynyl-terminated polyimide and the at least one allyl compatibilizer is carried out at a temperature which is below the temperature used to mix the cross-linkable organic cyanate ester resin and the cross-linkable aryl ethynyl-terminated polyimide.

In general, the cross-linkable organic cyanate ester resin can be mixed with the cross-linkable aryl ethynyl-terminated polyimide and the optional at least one allyl compatibilizer at any temperature which results in mixing of the individual components or, particularly when using the at least one allyl compatibilizer, following polymerization to form a homogeneous phase morphology. In this regard, however, the temperature should be selected so that polymerization does not occur immediately upon mixing, i.e. the mixing temperature should be below the polymerization temperature.

As an example, the cross-linkable organic cyanate ester resin may be mixed with the cross-linkable aryl ethynyl-terminated polyimide and the optional at least one allyl compatibilizer at a temperature in the range 50° C. to 180° C., preferably 70° C. to 160° C.

Preferably, the cross-linkable organic cyanate ester resin is mixed with the cross-linkable aryl ethynyl-terminated polyimide at a temperature in the range 50° C. to 180° C., preferably 70° C. to 160° C.

Alternatively, the cross-linkable organic cyanate ester resin is mixed with the cross-linkable aryl ethynyl-terminated polyimide and the at least one allyl compatibilizer at a temperature in the range 50° C. to 160° C., preferably 70° C. to 140° C.

As an example, prior to mixing with the cross-linkable aryl ethynyl-terminated polyimide and the optional at least one allyl compatibilizer, the cross-linkable organic cyanate ester resin is degassed at a temperature in the range 50° C. to 180° C., preferably 70° C. to 160° C., for a period of 10 min to 3 h, preferably 45 min to 2 h, and then mixed with the cross-linkable aryl ethynyl-terminated polyimide and the optional at least one allyl compatibilizer. As an example, degassing is carried out in a vacuum and/or with stirring.

Preferably, the mixture obtained comprising the cross-linkable organic cyanate ester resin, the cross-linkable aryl ethynyl-terminated polyimide and the optional at least one allyl compatibilizer is degassed at a temperature in the range 60° C. to 130° C., preferably 70° C. to 120° C. for a period of 1 h to 5 h, preferably 2 h to 4 h, i.e. prior to step ii). As an example, degassing is carried out in a vacuum and/or with stirring.

According to step ii), polymerization of the polymerizable thermoset composition from step i) is carried out at a temperature in the range 100° C. to 330° C.

In this regard, the polymerizable thermoset composition in accordance with the invention is preferably cast into a preferred mould or into a cavity and polymerized therein.

Polymerization is carried out at temperatures in the range 100° C. to 330° C. or 125° C. to 325° C., preferably for a total of 3 to 20 h or for a total of 5 to 15 h. Polymerization may be carried out in a single continuous procedure, or in a plurality of different steps at different times. Preferably, polymerization is carried out in a single, continuous procedure, for example in a curing cycle.

In one embodiment, the curing cycle is carried out in a manner such that the polymerization temperature is increased in stages, preferably by 40° C. to 60° C. respectively, for example by approximately 50° C., and the polymerization is carried out for 1.5 to 5 h or for 2 to 4.5 h at the temperature which is reached.

Because of the advantages offered by the polymerized thermoset in accordance with the invention, the present invention also pertains to the use of the polymerizable thermoset composition, as described herein, for the production of lightweight construction components, preferably carbon fibre composite materials (CFC). As an example, the polymerized thermoset is used as a light constructive component in thermally stressed and load-bearing light components which are exposed to high temperatures, for example temperatures of more than 200° C. In particular, the polymerized thermoset is used as a light constructive component in aerospace applications. As an example, the polymerized thermoset is used as a light constructive component in satellites, rockets, aircraft such as passenger aircraft or helicopters, railway vehicles such as trains, shipping such as passenger ships, or road vehicles such as cars.

In a further aspect, the present invention therefore concerns a lightweight construction component, preferably carbon fibre composite material (CFC), containing the polymerized thermoset as described herein.

As discussed above, the polymerizable thermoset composition in accordance with the invention may be used to obtain polymerized thermosets which have good thermomechanical properties, in particular a high glass transition temperature, as well as a high impact strength, and a high thermal capacity with a low hydrolytic degradation.

Furthermore, the polymerizable thermoset composition in accordance with the invention can be cured at moderate temperatures without the use of solvents and without pre-reacting the individual components, and thus processability is improved.

Figure 1:
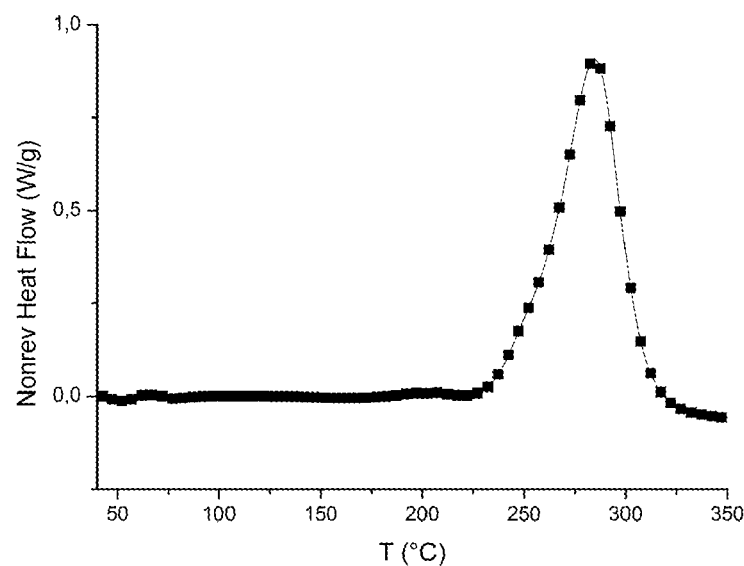
FIG. 1 shows a mDSC spectrum of the first heating cycle (curing) of an uncured thermoset blend consisting of Primaset® PT15/PETI330 [ratio approximately 5:1].

The invention will now be illustrated with the aid of the accompanying examples:

EXAMPLES

1. Methods a) DSC Measurements

DSC measurements were prepared with the aid of the instrument known as the "DSC Q2000" from TA Instruments in a nitrogen atmosphere. The spectra were recorded with the aid of the software "Thermal Advantage Release 5.4.0" and analysed using the software "Universal Analysis 2000, Version 4.5A" from TA Instruments. The heating rate was 5 IC/min, with a temperature of 20° C. to 400° C.

b) TGA Measurements

TGA measurements were prepared with the aid of the instrument known as the "TGA Q5000" from TA Instruments. The spectra were recorded with the aid of the software "Thermal Advantage Release 5.4.0" and analysed with the software "Universal Analysis 2000, Version 4.5A" from TA Instruments. The heating rate was 10 IC/min, with a temperature of 20° C. to 1000° C. The measurements were carried out in an oxygen atmosphere (ambient air).

c) DMTA Measurements

Dynamic mechanical thermoanalyses (DMTA) were carried out with the aid of the "Advanced Rheometric Expansion System (ARES)" rheometer from Rheometric Scientific. The Software "Rheometric Scientific, Version V 6.5.8" was used for the analysis. The heating rates were 3 K/min in all cases. The glass transition temperature $T_g$ corresponded to the maximum of the tan(δ) function and the onset temperature corresponded to the loss of the storage modulus G' by application of the tangent method.

d) FT-IR Characterization

The materials were characterized by means of FT-IR investigations. The spectra were recorded with the aid of the "Nicolet iN10" FT-IR microscope from Thermo Scientific. The measurements were carried out with the aid of an ATR crystal in the frequency range of 500 cm$^{-1}$ to 4000 cm$^{-1}$, with 64 scans being recorded per measurement. The optical microscope had a resolution of 25 μm×25 μm; the FT-IR spectrum was recorded with a resolution of 8 cm$^{-1}$. The program "Omnic 8.1.0.10" from "Thermo Scientific" was used to analyse the spectra.

e) Fracture Toughness $K_{IC}$ $K_{IC}$ measurements were made with the aid of the"BT-FR2.5TH.D14" instrument from Zwick/Roell (DE). The tests were carried out at a test speed of 10 mm/min. Testing was carried out in accordance with DIN ISO 13586.

The Software "testXpert II V3.1" from Zwick/Roell (DE) was used to analyse the results.

g) Water Absorption Capacity

The water absorption capacity was determined in accordance with DIN EN ISO 62 by placing the test samples in distilled water at 70° C. for 2 weeks. The mass of the test specimens was determined before and after placement and the water absorption capacity was determined therefrom as a percentage.

2. Materials Used

Primaset® PT15 (available from Lonza) is a cyanate ester resin consisting of oligo (3-methylene-1,5-phenylcyanate).

PETI330 (available from UBE Industries Ltd.) is a polymerizable aryl ethynyl-terminated polyimide with a glass transition temperature $T_g$ of 330° C., determined by DSC (pure resin powder after 1 hour at 371° C. in an aluminium cup at a heating rate of 20° C./min).

DABPA (available from GP Chemicals, Inc.) is 2,2'-diallylbisphenol A.

Preparation of Materials a) Preparation of CE/PETI (Non-Covalent Full IPN)

Figure 2:
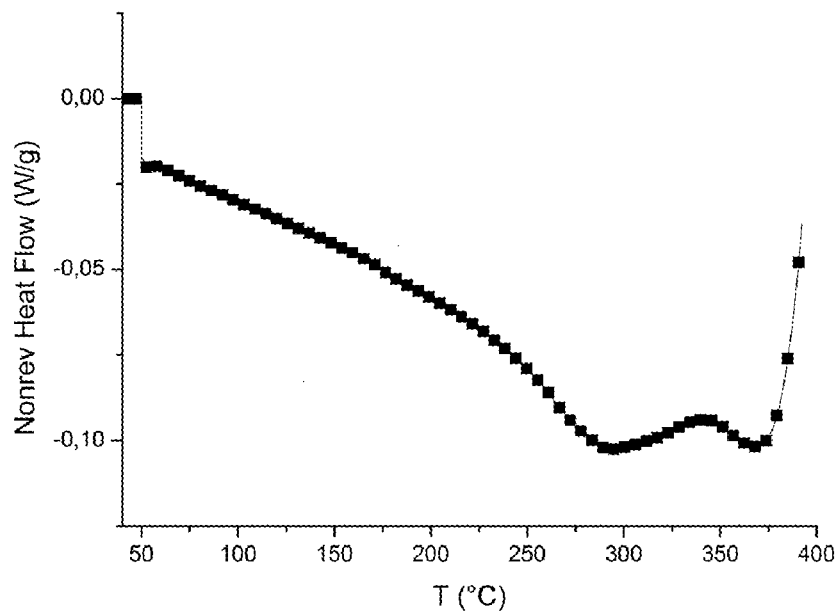
FIG. 2 shows a mDSC spectrum of the second heating cycle (post-curing) of a thermoset blend consisting of Primaset® PT15/PETI330 [ratio approximately 5:1] cured at 240° C. for 2.5 h.

The cyanate ester resin Primaset® PT15 was weighed into a 800 ml beaker and degassed for 1 hour in a vacuum oven at 80° C. Next, the phenyl ethynyl polyimide PETI330 was mixed with the hot cyanate ester in a Speedmixer rotating at a speed of 1350 min$^{-1}$ and at a pressure of 100 mbar and degassed in a vacuum oven at 80° C. for 2 hours and at 110° C. for 1.5 hours. Next, the hot reaction mixture was poured into a mould pre-heated to 150° C. and underwent the following curing cycle in a convection oven:

1. 150° C.→200° C. Heating rate: 2K/min
2. 200° C. 4 h isothermal
3. 200° C.→250° C. Heating rate: 2K/min
4. 250° C. 2.5 h isothermal
5. 250° C.→300° C. Heating rate: 2K/min
6. 300° C. 3.5 h isothermal Cross-linking of the two separate thermosetting systems was recorded and characterized with the aid of modulated dynamic differential calorimetry (mDSC). FIGS. 1 and 2 show the mDSC measurement for a Primaset® PT15/PETI330 blend (ratio of approximately 5:1). The homogeneous cross-linking of the cyanate ester began at a temperature of 178° C. and showed the maximum enthalpy at 186° C. After the pure resin panels had been cured at a temperature of 175° C., the material obtained was then examined again using MDSC. In the second heating cycle (FIG. 2), a signal was observed which started at a temperature of 295° C. with a maximum enthalpy at 342° C., which could be attributed to the homogeneous cross-linking of the PETI resin.

The thermo-mechanical properties of the Primaset® PT15/PETI330 blend were investigated with the aid of DMTA measurements and are summarized in Table 1.

TABLE 1

Summary of the thermo-mechanical properties of the cured materials from the cyanate ester Primaset ®PT15 and the polyimide PETI330.

| Proportion by weight of PETI330/ % by weight | $T_g^a$/ ° C. | $T_{onset}^a$/° C. | $T_d^b$/ ° C. | $T_{5\% \ weight \ loss}^b$/ ° C. |
| --- | --- | --- | --- | --- |
| 23 | 282/334 | 257/315 | 423/616 | 429 |
| 17 | 286/330 | 256/311 | 424/612 | 428 |
| 9 | 283/327 | 283 | 424/609 | 429 |
| 5 | 282/322 | 278 | 424/620 | 430 |

$^a$Measured using DMTA
$^b$Measured using TGA

Figure 3:
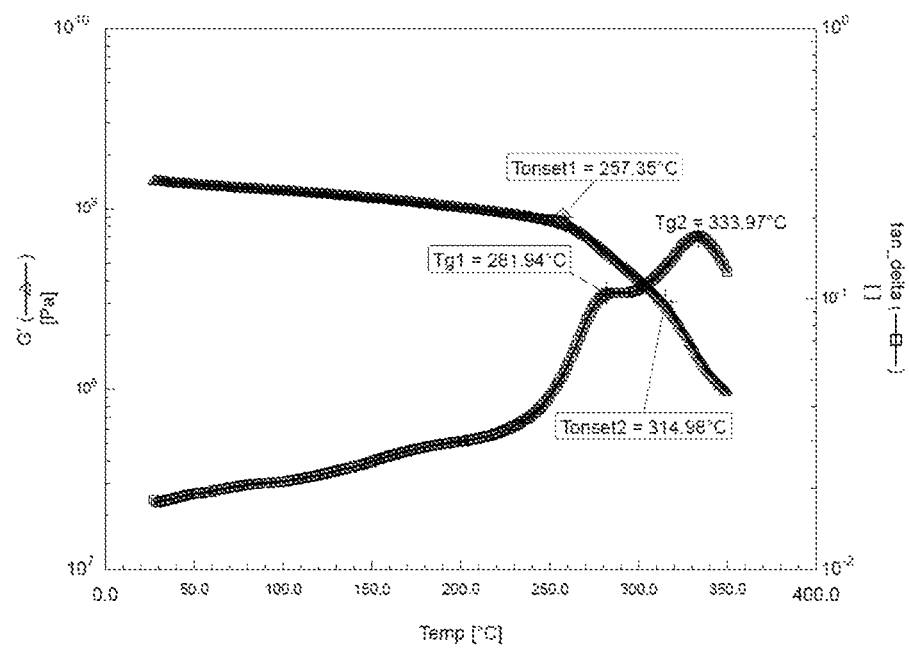
FIG. 3 shows a DMTA spectrum of a thermoset blend consisting of Primaset® PT15/PETI330 [ratio approximately 5:1] cured at 300° C. for 3.5 h. Heating rate: 3K/min, Frequency: 1 Hz, Deformation: 0.05%.

An example of a DMTA spectrum of the Primaset® PT15/PETI330 blend is shown in FIG. 3. It can be seen here that the tan(δ) function has two maxima. This and also the mDSC measurements lead to the conclusion that two independent matrix systems in the form of a "non-covalent full IPN" have been formed which are not interconnected, i.e. the cross-linkable organic cyanate ester resin and the cross-linkable aryl ethynyl-terminated polyimide are respectively in the form of non-covalently bonded interpenetrating polymeric systems.

b) Preparation of CE/PETI/DABPA Sequential IPN

Figure 4:
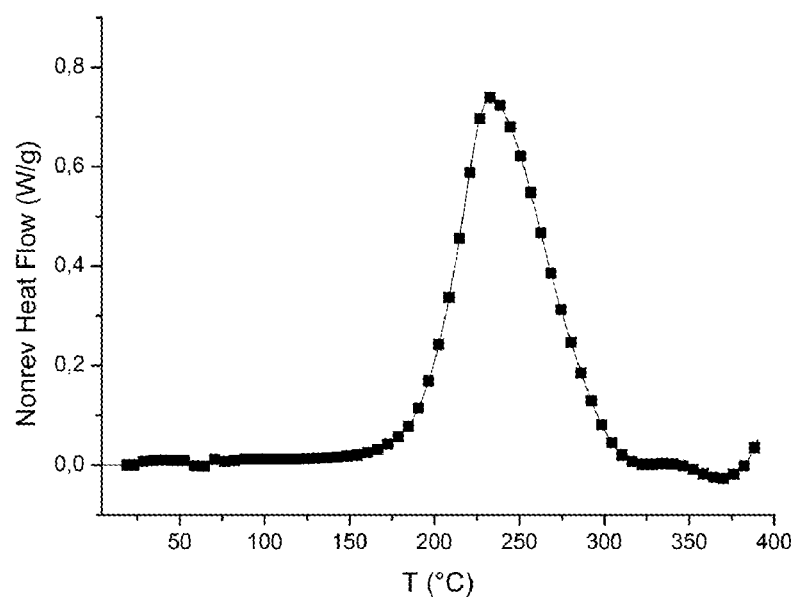
FIG. 4 shows a mDSC spectrum of the first heating cycle (curing) of an uncured thermoset blend consisting of Primaset® PT15/PETI330/DABPA [ratio approximately 100: 20:5].
Figure 5:
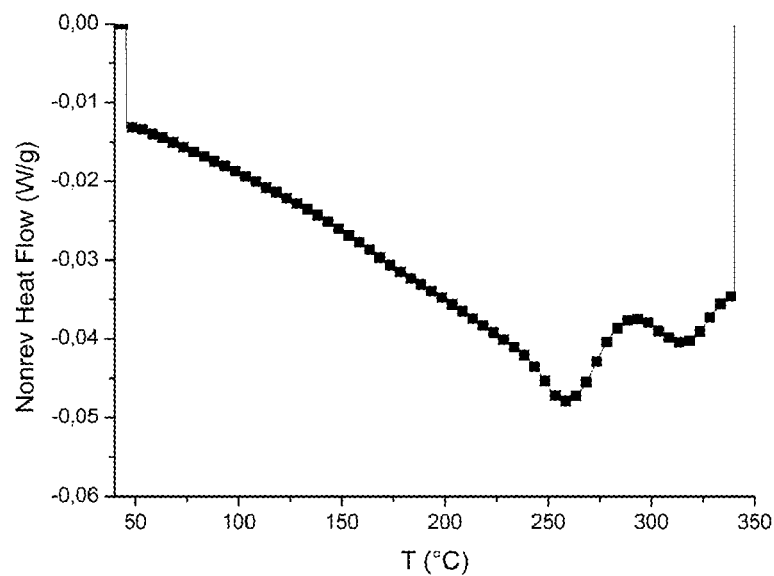
FIG. 5 shows a mDSC spectrum of the second heating cycle (post-curing) of a blend consisting of Primaset® PT15/PETI330/DABPA [ratio approximately 100:20:5] cured at 240° C. for 2.5 h.

The cyanate ester resin Primaset® PT15 was weighed into a 800 ml beaker and degassed for 1 hour in a vacuum oven at 80° C. Next, the phenyl ethynyl-polyimide PETI330 and the compatibilizer DABPA were mixed with the hot cyanate ester resin in a Speedmixer rotating at a speed of 1350 min$^{-1}$ and at a pressure of 100 mbar. Mixing was carried out at 80° C. for 1.5 hours in a vacuum oven, poured into a mould preheated to 130° C. and the following curing cycle was carried out:

1. 130° C.→165° C.
2. 165° C. 4 h isothermal
3. 165° C.→240° C., heating rate: 2K/min
4. 240° C. 2.5 h isothermal
5. 240° C.→300° C., heating rate: 2K/min
6. 300° C. 3.5 h isothermal Cross-linking of the two thermosetting systems with the aid of the compatibilizer DABPA was characterized with the aid of mDSC measurements. FIGS. 4 and 5 show the mDSC measurement of a Primaset® PT15/PETI330/DABPA blend (ratio approximately 100:20:5) by way of example. Cross-linking of the cyanate ester, catalysed by the hydroxide function of the DABPA, started at a temperature of 130° C. and had a maximum enthalpy at a temperature of 235° C. (FIG. 4). Furthermore, a signal was observed in the mDSC spectrum which started at 325° C. with a maximum enthalpy at 367° C., indicating a second exothermic reaction. After the pure resin panels had been cured at a temperature of 165° C., the material obtained was examined again using mDSC (FIG. 5). In the second heating cycle, an exothermic reaction was observed beginning at a temperature of 260° C. with a maximum enthalpy at 290° C. which can be attributed to the reaction of the terminal phenyl ethynyl group of the PETI330 and the allyl function of the compatibilizer DABPA. This took place at a lower temperature in comparison to the homogeneous cross-linking of the PETI330 resin.

Figure 6:
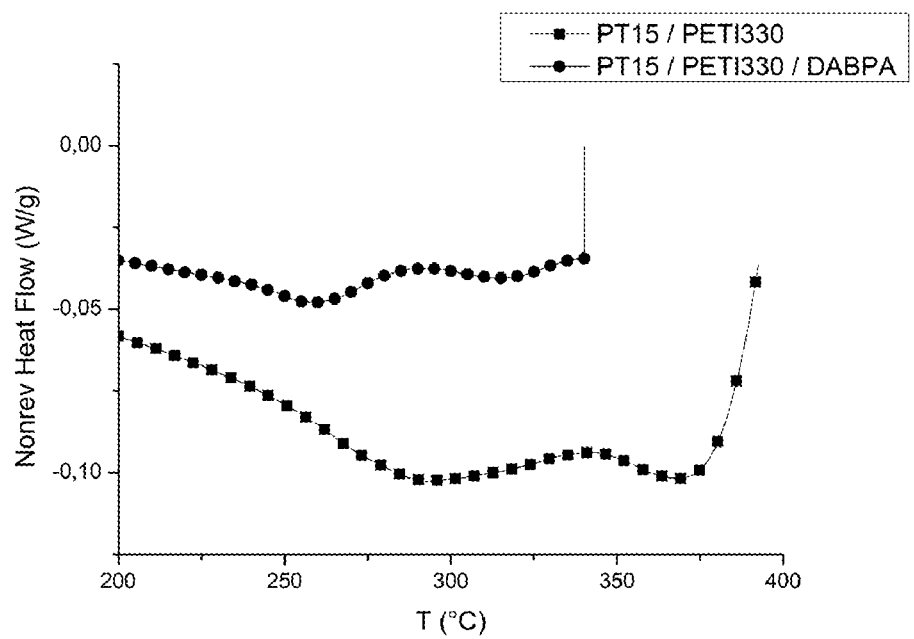
FIG. 6 shows a mDSC spectrum of the second heating cycle (post-curing) of a blend consisting of Primaset® PT15/PETI330 (circle) and Primaset® PT15/PETI330/ DABPA (square) cured at 240° C. for 2.5 h.

FIG. 6 shows the mDSC spectra of the second heating cycle for the Primaset® PT15/PETI330 blend with and without the addition of DABPA, for comparison. It can clearly be seen here that the cross-linking of PETI330 with the aid of the allyl DABPA begins at a temperature which is 30° C. lower than the homogeneous cross-linking of PETI330.

The thermo-mechanical properties of the Primaset® PT15/PETI330/DABPA blend were investigated with the aid of DMTA measurements and are summarized in Table 2.

TABLE 2

Summary of the thermo-mechanical properties of cured materials from Primaset ®PT15/PETI330/DABPA.

| Proportion by weight of PETI330/ % by weight | Proportion by weight of DABPA/ % by weight | $T_g{}^a$/° C. | $T_{onset}{}^a$/° C. | $T_d{}^b$/° C. | $T_{5\% \, weight \, loss}{}^b$/° C. |
|---|---|---|---|---|---|
| 22 | 6 | 307 | 266 | 418/606 | 423 |
| 16 | 4 | 318 | 276 | 417/583 | 421 |
| 8 | 2 | 328 | 284 | 417/587 | 421 |
| 4 | 0.95 | 315 | 281 | 417/590 | 422 |

[a]Measured using DMTA
[b]Measured using TGA

Figure 7:
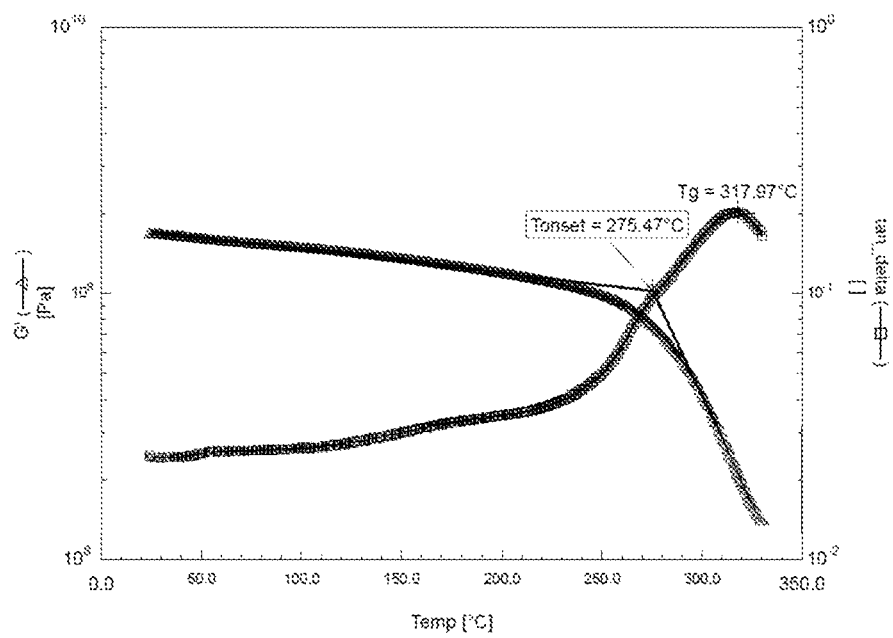
FIG. 7 shows a DMTA spectrum of a blend consisting of Primaset® PT15/PETI330/DABPA [ratio approximately 100:20:5] cured at 300° C. for 3.5 h. Heating rate: 3K/min, Frequency: 1 Hz, Deformation: 0.05%.

FIG. 7 shows, by way of example, a DMTA spectrum of the material consisting of Primaset® PT15/PETI330/DABPA (ratio of approximately 100:20:5). It can be seen here that after curing the material at 300° C., the material has only one $T_g$ and one $T_{onset}$ which is different from that of the $T_g$ and the $T_{onset}$ of the Primaset® PT15/PETI330 non-covalent full IPN (see Table 1 and Table 2). All of the materials prepared (see Table 2) have only one $T_{onset}$ and one $T_g$ in the DMTA spectrum, which indicates the formation of a homogeneous network.

This and the results of the mDSC measurements mean that the conclusion can be drawn that by adding the allyl compatibilizer DABPA, the triazine network, starting from the cyanate ester Primaset® PT15 and the polyimide network starting from PETI330 can be covalently linked together to result in a sequential IPN; i.e. the cross-linkable organic cyanate ester resin and the cross-linkable aryl ethynyl-terminated polyimide react via the at least one allyl compatibilizer with the formation of a covalently bonded interpenetrating polymeric system.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A polymerizable thermoset composition comprising:
a) a cross-linkable organic cyanate ester resin;
b) a cross-linkable aryl ethynyl-terminated polyimide, and
c) at least one allyl compatibilizer comprising at least two functional groups, wherein the functional groups are each independently selected from the group consisting of hydroxides, primary amines, secondary amines, anhydrides, cyanate esters, and epoxides.

2. The polymerizable thermoset composition as claimed in claim 1, wherein the cross-linkable organic cyanate ester resin is a compound of the formula (I):

(I)

wherein R represents an alkyl, alkenyl or aryl group.

3. The polymerizable thermoset composition as claimed in claim 1, wherein the cross-linkable organic cyanate ester resin is a compound of the formula (II):

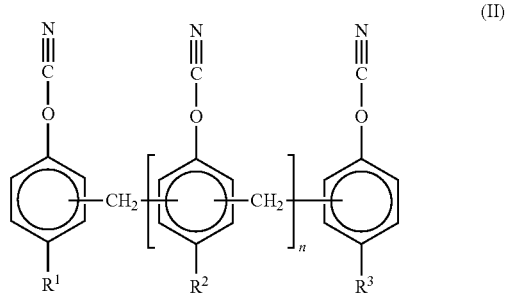

(II)

wherein $R^1$, $R^2$ and $R^3$, independently of each other, represent hydrogen or $C_1$-$C_{10}$ alkyl and n represents an integer from 0 to 20.

4. The polymerizable thermoset composition as claimed in claim 1, wherein the cross-linkable aryl ethynyl-terminated polyimide is a compound of the formula (III):

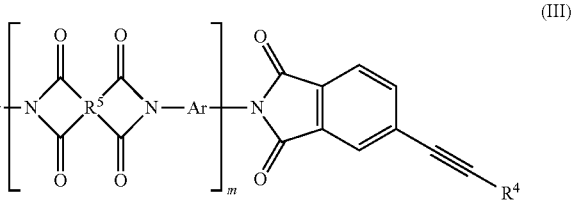

(III)

wherein Ar represents an intermediate segment which is selected from the group consisting of

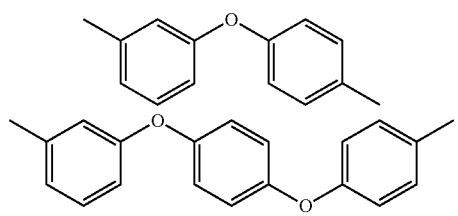

-continued

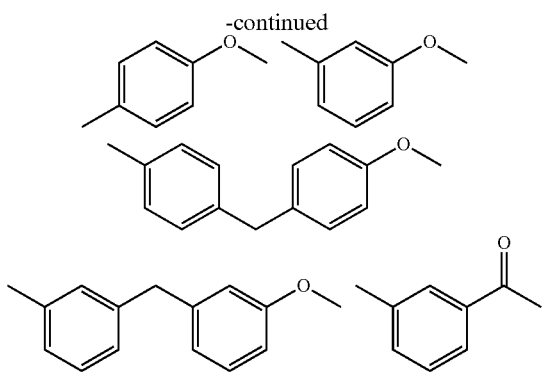

$R^4$ represents a group selected from the group consisting of

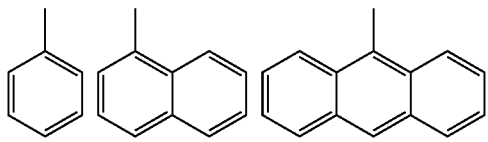

$R^5$ represents a group selected from the group consisting of

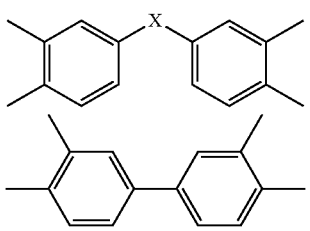

wherein X represents a group selected from the group consisting of —O—, —S—, —S(O$_2$)—, —C(O)—, —C(CH$_3$)$_2$—, —C(CF$_3$)$_2$—, —CH$_2$—, 3-oxyphenoxy, 4-oxyphenoxy, 4'-oxy-4-biphenoxy and 4-[1-(4-oxyphenyl)-1-methylethyl]-phenoxy, and m represents an integer from 1 to 40.

5. The polymerizable thermoset composition as claimed in claim 1, wherein the polymerizable thermoset composition contains the cross-linkable organic cyanate ester resin and the cross-linkable aryl ethynyl-terminated polyimide in a ratio by weight (wt/wt) of 200:10 to 20:10.

6. The polymerizable thermoset composition as claimed in claim 1, wherein the at least one allyl compatibilizer is a compound of the formula (IV):

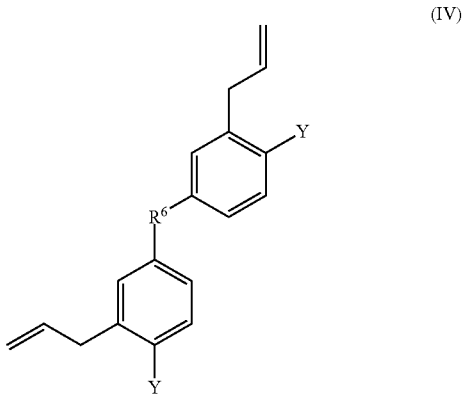

(IV)

wherein $R^6$ represents a group selected from the group consisting of —O—, —S—, —S(O)$_2$—, —C(O)—, —C(CH$_3$)$_2$—, —C(CF$_3$)$_2$—, —CH$_2$—, 3-oxyphenoxy, 4-oxyphenoxy, 4'-oxy-4-biphenoxy and 4-[1-(4-oxyphenyl)-1-methylethyl]-phenoxy; and Y each independently represents a functional group selected from the group consisting of hydroxides, primary amines, secondary amines, anhydrides, cyanate esters, and epoxides.

7. The polymerizable thermoset composition as claimed in claim 1, wherein the cross-linkable organic cyanate ester resin and the cross-linkable aryl ethynyl-terminated polyimide react through the at least one allyl compatibilizer with the formation of a covalently bonded interpenetrating polymeric system.

8. The polymerizable thermoset composition as claimed in claim 1, wherein the polymerizable thermoset composition contains the cross-linkable organic cyanate ester resin and the cross-linkable aryl ethynyl-terminated polyimide and the at least one allyl compatibilizer in a ratio by weight (wt/wt/wt) of 150:6:1 to 5:2:1.

9. A polymerized thermoset which is a reaction product of the polymerizable thermoset composition as claimed in claim 1.

10. A process for the production of a polymerized thermoset, comprising the following steps:
i) providing the polymerizable thermoset composition as described in claim 1; and
ii) polymerizing the polymerizable thermoset composition from step i) at a temperature in the range 100° C. to 330° C.

* * * * *